United States Patent
Canedo et al.

(10) Patent No.: US 9,513,966 B2
(45) Date of Patent: Dec. 6, 2016

(54) PARALLEL PROCESSING IN HUMAN-MACHINE INTERFACE APPLICATIONS

(75) Inventors: Arquimedes Martinez Canedo, Princeton, NJ (US); Sven Hermann, Princeton Junction, NJ (US); Lingyun Max Wang, Princeton, NJ (US); Holger Strobel, Steinbach (DE)

(73) Assignee: Siemens Aktiengesellschaft, Munich (DE)

( * ) Notice: Subject to any disclaimer, the term of this patent is extended or adjusted under 35 U.S.C. 154(b) by 379 days.

(21) Appl. No.: 13/983,109

(22) PCT Filed: Feb. 1, 2012

(86) PCT No.: PCT/US2012/023418
§ 371 (c)(1),
(2), (4) Date: Oct. 1, 2013

(87) PCT Pub. No.: WO2012/112302
PCT Pub. Date: Aug. 23, 2012

(65) Prior Publication Data
US 2014/0026145 A1    Jan. 23, 2014

Related U.S. Application Data

(60) Provisional application No. 61/443,812, filed on Feb. 17, 2011.

(51) Int. Cl.
*G06F 9/46*      (2006.01)
*G06F 9/45*      (2006.01)
*G06F 3/00*      (2006.01)
*G06F 3/048*     (2013.01)
*G06F 9/50*      (2006.01)
(Continued)

(52) U.S. Cl.
CPC . *G06F 9/50* (2013.01); *G06F 8/00* (2013.01); *G06F 8/34* (2013.01); *G06F 8/38* (2013.01); *G06F 8/41* (2013.01); *G06F 8/433* (2013.01); *G06F 8/445* (2013.01); *G06F 8/447* (2013.01); *G06F 8/45* (2013.01); *G06F 9/4443* (2013.01); *G06F 9/48* (2013.01); *G06F 9/4881* (2013.01); *G06F 9/505* (2013.01); *G06F 9/5022* (2013.01); *G06F 9/5027* (2013.01); *G06F 9/5038* (2013.01); *G06F 9/5044* (2013.01); *G06F 9/52* (2013.01)

(58) Field of Classification Search
None
See application file for complete search history.

(56) References Cited

U.S. PATENT DOCUMENTS 7,434,203 B2 * 10/2008 Stienhans ................. G06F 8/38
715/700
7,437,581 B2 * 10/2008 Grochowski ........... G06F 1/206
712/E9.053

(Continued)

OTHER PUBLICATIONS

International Search Report dated Sep. 6, 2012.

*Primary Examiner* — Charles Swift

(57) ABSTRACT

A human-machine interface (HMI) application (26) uses parallel processing. The HMI engineering system (24) allows explicit specification (44) of different cores of a multi-core processor (16) for different elements and/or actions. The programmer may design the HMI application for concurrent operation. The HMI engineering system (24) or runtime system (28) may test (56) for data dependency amongst the elements or actions and automatically assigns different cores where data is independent. During runtime, different threads for the HMI application (e.g., different elements and/or actions) are scheduled for different cores.

14 Claims, 4 Drawing Sheets

(51) Int. Cl.
*G06F 9/48* (2006.01)
*G06F 9/44* (2006.01)
*G06F 9/52* (2006.01)

(56) References Cited

U.S. PATENT DOCUMENTS

| | | | |
|---|---|---|---|
| 8,762,886 B2* | 6/2014 | Lietzke | G06F 3/04812 345/156 |
| 2002/0010732 A1* | 1/2002 | Matsui | G06F 8/451 718/107 |
| 2003/0163512 A1* | 8/2003 | Mikamo | G06F 9/5066 718/102 |
| 2004/0064817 A1* | 4/2004 | Shibayama | G06F 9/5066 718/104 |
| 2006/0136878 A1 | 6/2006 | Raghunath et al. | |
| 2008/0270920 A1* | 10/2008 | Hudson | G06F 8/34 715/763 |
| 2008/0301559 A1* | 12/2008 | Martinsen | G06F 8/20 715/710 |
| 2009/0064168 A1* | 3/2009 | Arimilli | G06F 9/522 718/105 |
| 2009/0222654 A1* | 9/2009 | Hum | G06F 13/24 713/100 |
| 2010/0055663 A1* | 3/2010 | Konrad | G01N 35/00623 435/3 |
| 2010/0138810 A1* | 6/2010 | Komatsu | G06F 8/30 717/107 |
| 2010/0306733 A1 | 12/2010 | Bordelon et al. | |
| 2011/0107227 A1* | 5/2011 | Rempell | G06F 9/4443 715/738 |
| 2011/0161637 A1* | 6/2011 | Sihn | G06F 9/5066 712/220 |
| 2011/0276978 A1* | 11/2011 | Gaiarsa | G06F 9/46 718/104 |
| 2011/0302217 A1* | 12/2011 | Heidasch | G06Q 30/02 707/802 |
| 2013/0160023 A1* | 6/2013 | Suzuki | G06F 9/4887 718/104 |

* cited by examiner

PARALLEL PROCESSING IN HUMAN-MACHINE INTERFACE APPLICATIONS

RELATED APPLICATIONS

The present patent document claims the benefit of the filing date under 35 U.S.C. §119(e) of Provisional U.S. Patent Application Ser. No. 61/443,812, filed Feb. 17, 2011, which is hereby incorporated by reference.

BACKGROUND

The present embodiments relate to human-machine interface (HMI) applications. Modern automation systems combine information technology with industrial machinery to assist the design, implementation, and monitoring of control systems. A HMI displays machinery data to a human operator and receives commands from the operator to control the machinery and process performed by the machinery. HMI devices may be considered the "windows" to very complex industrial processes.

HMI applications for operating an HMI device are developed with an engineering system. Engineering systems allow the application developer to create HMI applications without exposing details of the underlying architecture to the application developer. The HMI screen includes different elements placed by the application developer. For each of these elements, the application developer creates a list of actions to be executed each cycle. The list is created from elements with predefined actions or a list of possible actions for selection. These actions may be for changing values (e.g. SetValue) of variables (Tags) or changing an appearance and properties of the elements themselves (e.g. color, X-position, Y-position). An HMI program loop of the HMI application is created from the selected elements and corresponding actions.

The engineering system or the runtime process for the HMI device compiles the input from the application developer to implement the HMI application. The runtime process is performed on the HMI device, which is implemented with a single-core central processing unit (CPU).

The HMI program loop controls execution of the actions. A single thread traverses the list of elements of the screen and executes the list of actions for each element. The scheduling is left to the operating system. The operating system may schedule other threads, such as associated with communications, into a separate processing unit. However, the execution of the HMI program loop with the elements and actions is typically serialized in a round-robin fashion on every execution cycle. This serialization creates a bottleneck that affects response time, rendering, and missed communication deadlines with external devices.

SUMMARY

Systems, methods and computer readable media are provided for parallel processing in a human-machine interface (HMI) application. The HMI engineering system allows explicit specification of different cores of a multi-core processor for different elements and/or actions. Any number of cores may be used, such as 2, 4, or 8. The programmer designs the HMI application for concurrent operation of HMI elements. Alternatively or additionally, the HMI engineering system or runtime system tests for data dependency among the HMI elements or actions and automatically assigns different cores where data is independent. During runtime, different threads for the HMI application (e.g., different HMI elements and/or actions) are scheduled for different cores.

In a first aspect, a system is provided for parallel processing in a human-machine interface (HMI) application. At least one sensor connection and at least one actuator connection for industrial machinery are provided. A multi-core processor electrically connects with the at least one sensor connector and the at least one actuator connector. A display is operable to display elements associated with the at least one sensor connector and the at least one actuator connector. A memory has stored the elements for the display and actions corresponding to the elements. The multi-core processor is configured to associate a first sub-set of the actions with a first core of the multi-core processor, associate a second sub-set of the actions with a second core of the multi-core processor, schedule first and second HMI threads for the first and second cores of the multi-core processor based on the first and second sub-sets, process the first and second HMI threads with the first and second cores, and control the at least one actuator and the display of the elements as a function of the processing of the first and second HMI threads.

In a second aspect, a method is provided for parallel processing in a human-machine interface (HMI) application. HMI elements are established for display on a screen. A plurality of computer processing units of a multi-core processor is listed. An assignment by a user of different ones of the computer processing units to different ones of the HMI elements is received. Actions for each of the HMI elements are set. The HMI elements, the corresponding actions, and assigned computer processing units are stored as an HMI application.

In a third aspect, a non-transitory computer readable storage medium has stored therein data representing instructions executable by a programmed processor for parallel processing in a human-machine interface (HMI) application. The instructions include analyzing dataflow for a plurality of HMI actions, identifying at least first and second actions with no data dependency, assigning the first action to a first core of the processor, assigning the second action to a second core of the processor, implementing first and second threads for the first and second actions, and controlling an HMI device based on the implementing of the first and second threads.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EMBODIMENTS

There is an increasing demand for more computation capabilities in HMI devices, such as control panels for industrial machinery. The use of video and imaging in HMI applications is getting more popular. Embedded processors with multiple cores may be used to satisfy these demands. Multi-core CPUs may be superior in terms of concurrency, power consumption, and heat dissipation than single-core CPUs. By parallelizing an HMI application for multi-core systems, better performance may be achieved. However, leaving the assignment of the multiple cores to the operating system may not provide optimum improvement.

HMI applications that make effective use of multi-core processors are created. To effectively exploit multi-core processors, the application developer and the engineering system provide parallel programming primitives to create concurrent HMI applications. The application developer has the freedom to explicitly execute parts of the HMI application in the processing units of their choice.

The programming primitives for parallelization of the application are used in the engineering system. There are several runtime activities that may be effectively parallelized automatically or without explicit user intervention or assignment. For example, communication to external devices, access to the file system to read/write files, and rendering of user-interface elements may be parallelized automatically. The actions of different elements may be parallelized also or instead. Two cases are provided for parallelization: manual scheduling by the application developer, and automatic partitioning and scheduling of specialized activities by the runtime system. Some actions for elements may be automatically parallelized without user intervention. This frees the application developer who is not familiar with parallel programming from explicitly exploiting concurrency. If the application is running on a multi-core system, automatic parallelization makes effective use of the computing resources.

Parallel execution of an HMI application may have one or more of the following advantages. Workload for processing the elements in the screen may be distributed among the available cores and the overall execution time of the application is reduced. Reduced execution time for triggered events may improve the HMI response times and therefore may improve the user experience when interacting with the application. More elements per screen may be processed. Current systems limit the amount of elements per screen to a certain number to be able to provide fast response times. The cycle time of the HMI application may be reduced. Complex and CPU intensive applications, such as high-definition video, may be processed more easily with multiple-cores.

Figure 1:
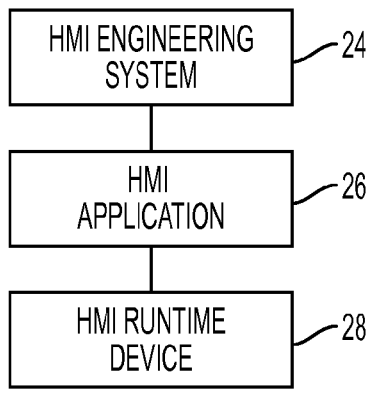
FIG. 1 is a block diagram of one embodiment of a multi-layer system for parallel processing in a human-machine interface (HMI) application.

FIG. 1 shows one embodiment of a HMI system. The HMI system is a host computer, man-machine interface, and/or graphic user interface for interaction with and control of programmable logic controllers, actuators, sensors, or combinations thereof.

The HMI system includes a HMI engineering system 24, a HMI application 26, and a HMI runtime system 28. Additional, different, or fewer components may be provided. Any one or more of the components may implement parallelism.

The HMI engineering system 24 is used by the application developer to create the HMI application 26. The HMI engineering system is a personal computer, workstation, server, or other processor providing a pre-defined set of rules for the application developer. For example, the pre-defined rules prohibit the application developer from specifying how the code in the HMI application 26 is executed in the actual CPUs of the HMI device. The HMI engineering system 24 provides blocks of code associated with elements, such as in a visual programming environment. The application developer interacts with the HMI engineering system 24 to select elements and corresponding actions for operation of the HMI device. The application developer schedules actions, and the HMI engineering system 24 assigns code or the pre-defined rules to the scheduled actions. The selections are compiled, using pre-defined rules, into code for the HMI application. Alternatively, manual programming of the code itself may be used. An example HMI engineering system is SIMATIC WinCC Flexible ES, from Siemens Industry.

The HMI application 26 is created for the HMI runtime system 28. The HMI application 26 is a program, code, or software for running on the HMI runtime system 28. The HMI application 26 defines the user interface and associated control of industrial machinery. Sensor inputs, actuator outputs, and programmable logic controller instructions, in combination with displayed elements, are controlled based on the HMI application 26. Inter-device and programmable logic controller communications or control functions may be provided. The HMI application 26 is designed to interact with sensors, actuators, controllers, and the physical process.

The HMI runtime system 28 is a HMI device, such as a control panel. The HMI runtime system 28 executes the HMI application. The HMI application 26 is loaded onto and installed in the HMI runtime system 28, such as by data transfer over a network or from a non-transitory medium (e.g., disk or memory device). SIMATIC WinCC Flexible RT, from Siemens Industry, is an example of a runtime system.

The HMI engineering system 24, the HMI application 26, and/or the HMI runtime system 28 support parallel processing. Parallel programming primitives are provided in the HMI engineering system 24 for development of the HMI application 26. The primitives are code for selecting, manually, parallelization for different elements and/or actions. The parallelization primitives are accessible for the application developer to explicitly assign. Alternatively or additionally, automatic parallelization is available for some of the operations and constructs of HMI Applications 26. The HMI engineering system 24 automatically assigns elements and/or actions to different computer processing units of the same processor. Conflict detection or other dependency analysis may be used for automatic assignment.

The resulting HMI application 26 includes mapping of the elements and actions to threads for specific CPUs. Elements are mapped to threads, and threads to CPUs. Threads are the computation units that encapsulate a set of elements and actions. This may be expressed as mapping the elements or actions to specific CPUs. The HMI runtime system 28 includes the multi-core processor and operating system for implementing different threads in different cores. The threads are assigned by the HMI application 26 when running on the HMI runtime system 28 to different cores. Alternatively, the HMI runtime system 28 may dynamically implement the automated assignment of threads for elements and/or actions to different cores.

Figure 2:
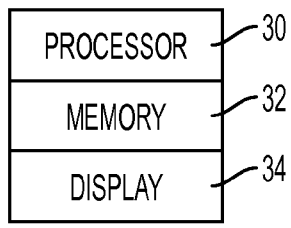
FIG. 2 is a block diagram of an engineering system for parallel processing in a HMI application, according to one embodiment.

FIG. 2 shows one embodiment of a system for parallel processing of a HMI application. The system of FIG. 2 represents the HMI engineering system.

The system includes a processor 30, a memory 32, and a display 34. Additional, different, or fewer components may be provided. For example, a user input device is provided.

The computer processing performed by the processor 30 may be implemented in various forms of hardware, software, firmware, special purpose processors, or a combination thereof. Some embodiments are implemented in software as a program tangibly embodied on a non-transitory program storage device. By implementing with a system or program, assignment of elements and/or actions for parallel processing may be provided as part of creation of the HMI application.

The processor 30 and/or memory 32 are part of a computer, personal computer, server, workstation, network processor, or other now known or later developed processing system. Various peripheral devices such as, for example, the display 34, a disk storage device (e.g., a magnetic or optical disk storage device), a keyboard, a printing device, and a mouse, may be operatively coupled to the processor 30. A program may be uploaded to, and executed by, the processor 30 comprising any suitable architecture. Likewise, processing strategies may include multiprocessing, multitasking, parallel processing and the like. The processor 30 is implemented on a computer platform having hardware, such as one or more central processing units (CPU), a random access memory (RAM), and input/output (I/O) interface(s). The computer platform also includes an operating system and microinstruction code. The various processes and functions described herein may be either part of the microinstruction code or part of the program (or combination thereof) which is executed via the operating system. Alternatively, the processor 30 is one or more processors in a network.

The instructions, user input, rules, and/or other information are stored in a non-transitory computer readable memory, such as the memory 32. The memory 32 is an external storage device, RAM, ROM, and/or a local memory (e.g., solid state drive or hard drive). The same or different computer readable media may be used for the instructions and other data. The memory 32 may be implemented using a database management system (DBMS) managed by the processor 30 and residing on a memory, such as a hard disk, RAM, or removable media. Alternatively, the memory 32 is internal to the processor 30 (e.g. cache). The memory 32 stores images, elements, actions, HMI device information (e.g., number of cores), sensor connections, actuator connections, and/or rules.

The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network. In yet other embodiments, the instructions are stored within a given computer, CPU, GPU or system. Because some of the constituent system components and method steps depicted in the accompanying figures are preferably implemented in software, the actual connections between the system components (or the process steps) may differ depending upon the manner in which the present embodiments are programmed.

The display 34 is a CRT, LCD, projector, plasma, printer, or other display for displaying the options available in the engineering system. For example, the display 34 displays the example screens 70 shown in FIG. 4 or 6. The display 34 assists the application developer in programming the HMI application by displaying various elements 72-86 to be presented to the user of the HMI device.

Figure 3:
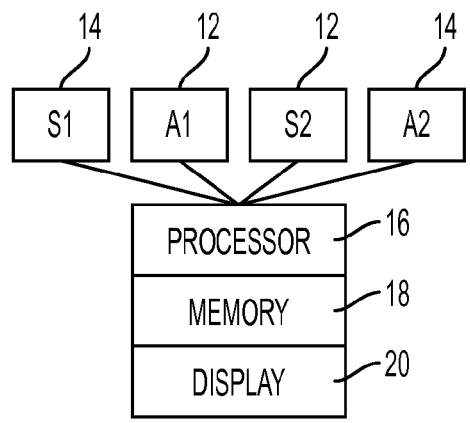
FIG. 3 is a block diagram of a runtime system for parallel processing in a HMI application, according to one embodiment.

FIG. 3 shows one embodiment of a system for parallel processing in a HMI application. The system of FIG. 3 represents the HMI runtime system, such as a HMI device. One example is a panel for control of industrial machinery. The system may be a computer, workstation, server, or other HMI device.

The processor 16, memory 18, and display 20 may be the same or different type of device as described for the processor 30, memory 32, and display 34 for the system of FIG. 2. The processor 30 of the HMI runtime system is a multi-core processor. Any number of cores may be provided, such as 2-8 cores. Each core is a separate instance of a computer processing unit. The cores are on a same semiconductor chip, but able to operate independently and in parallel. Different processes may be performed by the different cores at the same time.

The multi-core processor 16 electrically connects to the sensor and actuator connectors 12, 14 and any other communications connections. The electrical connection is through one or more input or output pins of the processor 16, a bus, a communications interface, a semiconductor chip, or other device or devices for facilitating the input and output of the processor 16. The electrical connection is on the same circuit board, in a same housing, or is external to the processor 16.

The display 20 of the HMI runtime system is a touch screen in one embodiment. The touch screen facilitates user interaction with the HMI device, such as using soft buttons (e.g., displayed button element 78 where the screen detects user contact with the displayed element 78). Alternatively or additionally, dedicated button, knobs, sliders, switches, or other user controls are provided separately from the display.

Figure 4:
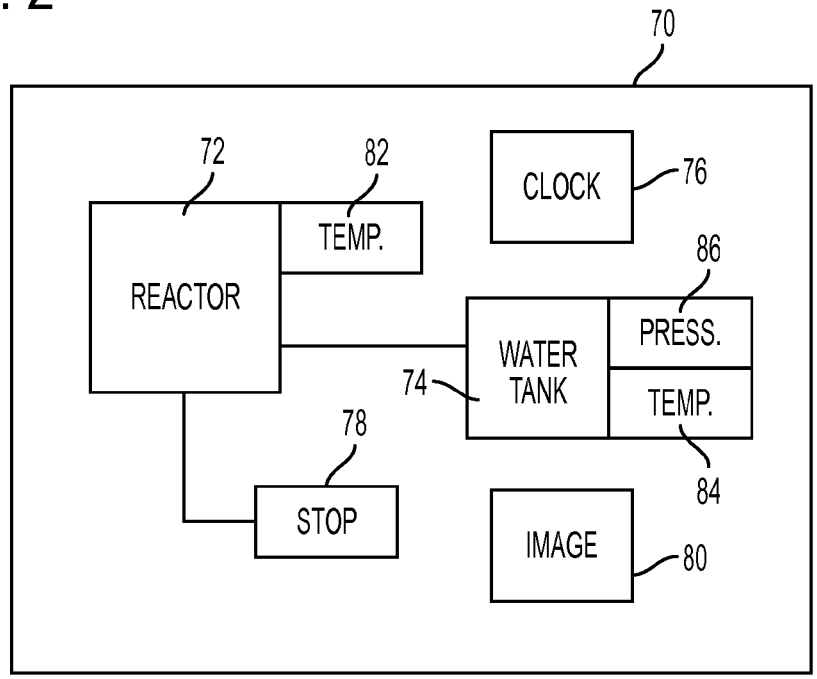
FIG. 4 is an example display for an HMI application.
Figure 5:
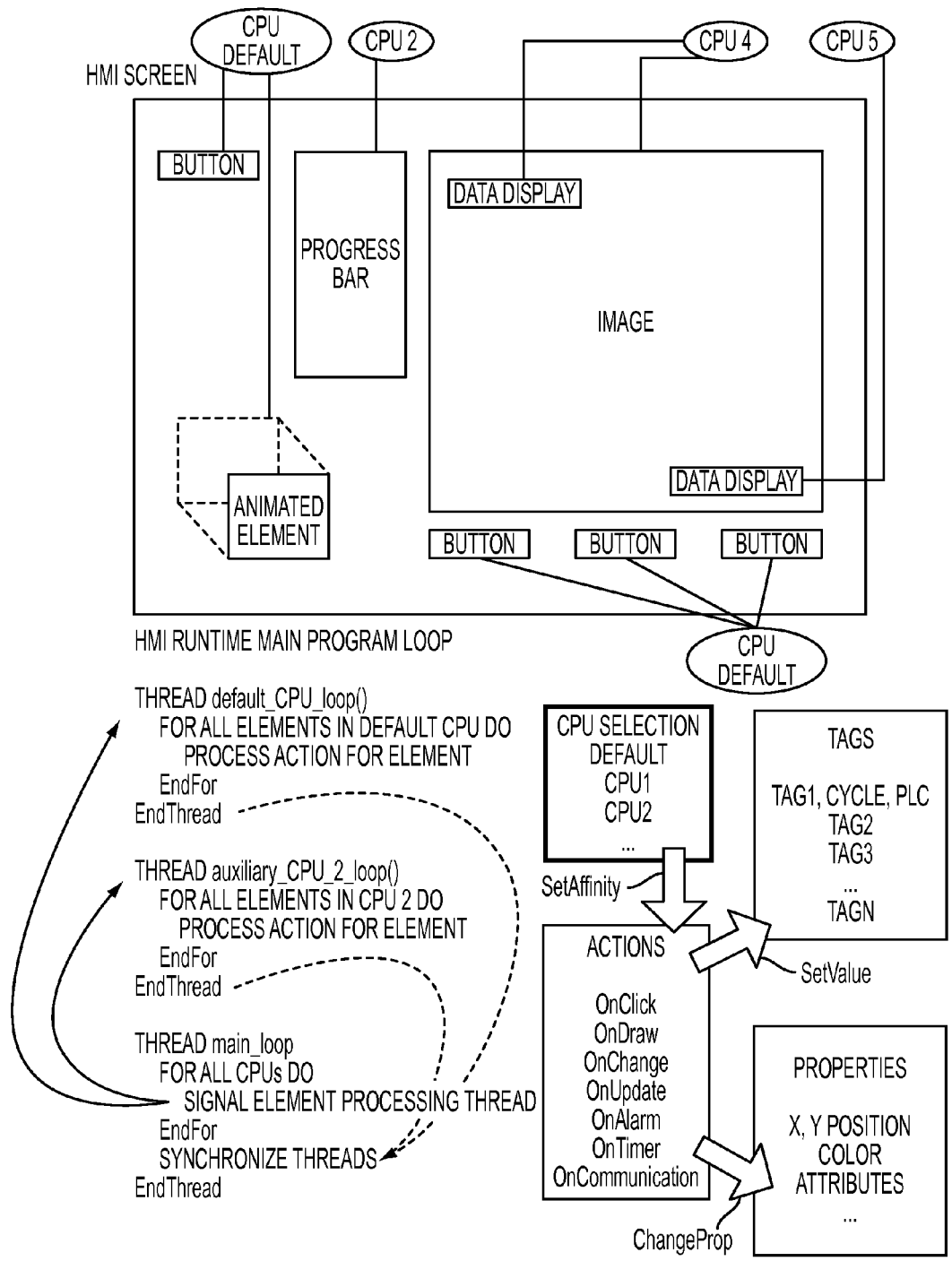
FIG. 5 is an example illustration of explicit assignment in an engineering system and runtime scheduling of corresponding threads.

The display 20 displays the elements associated with one or more sensors and/or actuators. For example, the screen 70 of FIG. 4 is a screen displayed for an HMI device. Various elements 72-86 are provided. One element is an image 80. The image 80 may be computer generated or a feed from a camera (e.g., a real-time view of the machinery). Another element is a clock 76. Yet another element is a button 78, presented in this example as an emergency stop button. Elements for particular devices being controlled or monitored are provided, such as the reactor 72 and water tank 74. The device elements may alternatively or additional be for actuators, such as a pump for the water tank 74 and a fuel feed control for the reactor 72. Data elements, such as the temperature 82, 84 and pressure 86 are provided. The data elements 82, 84, 86 indicate information from or derived from sensors. Other data may be presented, such as programmed information (e.g., a schedule) or history information. Additional, different, or fewer elements may be provided. For example, FIG. 5 shows a screen with additional buttons, an animated element, and a progress bar in addition to an image and data display elements.

The memory 18 of the HMI runtime system stores the elements for display and actions corresponding to the elements. The actions are implemented as part of the HMI application run by the processor 16. The elements are for display on the display 20. The elements may have different states, such as red and/or flashing for emergency or error and blue and steady otherwise. The different possible states and a current state are stored, such as being stored as part of the HMI application (e.g., provided by the code).

The memory 18 stores a list of cores of the multi-core processor 16. The list may be organized in one place or may be distributed, such as being indicated for different threads.

The memory 18 stores the instructions for the HMI runtime system. The instructions include the HMI application. The operating system or rules for implementing the HMI application and any components of the HMI device may be stored.

The system also includes sensor and actuator connections 12, 14. Additional, different, or fewer connections may be provided. For example, additional or fewer sensor or actuator connections are provided. As another example, one or more connections for communications with other HMI runtime systems (e.g., other panels), controlling workstation or computer, or programmable logic controllers are provided.

The sensor connections 14 are ports of an interface. Physical and electrical connection is provided for receiving measurements from signals. Control information may or may not be provided through the connection to the sensors. Any number of sensors may be connected to any given sensor connection 14, such as in a bussed or sensor address system.

Similarly, the actuator connections 12 are ports of an interface. Physical and electrical connection is provided for transmitting control signals to the actuators. Response or measurement information may or may not be provided through the connection from the actuators. Any number of actuators may be connected to any given actuator connection 12, such as in a bussed or actuator address system.

The sensors and actuators are for control of industrial machinery. For example, the sensors include pressure, temperature, force, position, light, humidity, optical, or other sensors for monitoring an industrial process or equipment. As another example, the actuators include pneumatic, hydraulic, electric, or other sources of force for changing the industrial process or equipment operation. Some example industrial machinery includes machinery of power facilities, chemical plants, manufacturing facilities, heat and ventilation systems, air conditioning systems, fire safety systems, reactors, or other collections of interacting parts. In other examples, the industrial machinery includes specific units, such as a cutting machine, a pressing machine, a robot, a tank, a vehicle, or any other device.

Using the HMI engineering system to design the HMI application and/or the HMI runtime system to implement the HMI application, the multi-core processor 16 of the HMI runtime system is configured to associate different actions with different cores. For example, one sub-set of actions is configured to be implemented by one core and another sub-set of different actions is configured to be implemented by another core. The different actions may be of a same or different type, but use different data. Parallel programming primitives are provided for configuring in the HMI engineering system and the HMI runtime system. The resulting HMI application includes instructions for parallel processing.

Other operations than actions associated with the elements may be assigned different cores. For example, communication with sensors and/or programmable logic controllers (PLC) is assigned to a particular core. Since the communications may have high priority, the assignment may be to a dedicated core for execution. Alternatively, other operations are assigned to the same core.

In one embodiment, the cores are assigned explicitly by the application developer. The application developer assigns the different actions or groups of actions to different cores. For example, the various actions are assigned by element. The actions for each given element are assigned to a same core, but the actions for different elements may be assigned to different cores. One or more cores may be assigned actions from a plurality of elements.

The application developer, using an understanding of the architecture of the industrial machinery and/or the HMI device, may know which parts of the HMI application may be executed in different cores to improve performance. A learned or natural sense of concurrency in the HMI application allows assignment to different cores. The parallelism achieved at the user level may be higher than the parallelism achieved at the runtime or OS level. The HMI engineering system gives application developers control over mapping the components of the HMI application to specific cores.

In the example of FIG. 4, the HMI Application monitors the core temperature 82 of the nuclear reactor 72, and the temperature 84 and pressure 86 of a water tank 74. The HMI application has an Emergency Stop button 78 that the operator may trigger when the nuclear reactor's core temperature 82 reaches a hazardous level. Additionally, there is a clock 76 showing the time of the day. The active elements of this application may be the temperature 82 of the core, the water tank temperature 84, the water tank pressure 86, the clock 76, and the button 78. The reactor 72 and the water tank 74 may be mere representations rather than actuators. Alternatively, the reactor 72 and water tank 74 are dynamic or may change or are associated with actuators.

The active elements may communicate, such as periodically, with external devices (e.g. the programmable logic controller connected to the nuclear reactor 72, the programmable logic controller connected to the water tank 74, and with the temperature and pressure sensors) and communicate locally to the HMI device (e.g. to get the time of the day). This architecture has natural concurrency because the reactor temperature 82, the water tank temperature 84 and pressure 86, and the clock 76 are communicating with different devices and their execution does not have any interdependencies. The actions associated with these elements may be safely executed in parallel.

FIG. 5 shows example assigning in the HMI engineering system. A CPU selection is available in addition to the workflow of creating elements and actions for the HMI application. After or while placing any desired elements on the screen, the user may program the elements. The programming includes setting an affinity for the element and/or actions. A list of CPU options is provided in a menu for each element. The list includes all possible cores or a subset of cores (e.g., one or more cores may not be available due to dedication to other processes). For example, the CPU selection menu displays all of the CPUs available in the host computer or the processor of the HMI device/runtime system. The developer selects an available core from the menu. Alternatively, the developer assigns a number or other value of a variable representing a core with or without user interface presentation of options. The assignment of the CPU to the element or actions places the element or actions in a thread for the CPU. The thread binds the actions in the elements of the screen to specific CPUs. FIG. 5 shows assignments for the elements.

In one embodiment, a default option is available to the developer. Rather than selecting between different CPUs, the developer may select or the HMI engineering system automatically assign a "default" setting for the CPU. For example, the developer may not want to deal with the mapping of elements or actions to threads for CPUs, so selects the default setting. The default setting may emulate the behavior of a single-CPU running of the HMI application. The operations for the different elements are assigned to one core and run sequentially by the core. This may allow backward compatibility with legacy HMI applications not designed to exploit multi-core machines. Alternatively, the selection of the "default" indicates that automated core assignment is to be performed by the HMI engineering system or the HMI runtime system. Instead, a separate "automatic" selection may be provided.

The developer similarly chooses one or more actions from a list of actions for every element in the screen. The list includes all possible actions or just possible actions for a given element. Alternatively, the list includes predetermined actions for a selected element. The CPU selection precedes the selection of the actions, but may be performed after. Other selections may be performed for programming the elements and actions, such assigning properties to the elements, setting variables, and setting values of variables for the selected actions.

In one embodiment, the different actions or elements are automatically assigned to the different cores. For example, the developer selects an "automatic" or "default" core in the HMI engineering system. Alternatively, the automatic assignment is performed without user selection or despite user selection. For example, load balancing may be performed to shift actions from one or more cores to other cores despite developer assignment.

Automatic parallelization allows HMI applications to benefit from multi-core technology even though the application developer does not exploit concurrency. In some cases, the application developer is not familiar with parallel programming or does not have time to think about concurrency and therefore simply leaves all the elements to the "default" setting. In other cases, the HMI application is created without a HMI engineering system that includes core assignment capability for the developer. The HMI engineering system or the HMI runtime system may safely parallelize the execution of certain elements.

Concurrency is automatically detected and exploited without the intervention of the developer. Different operations modifying different data, and therefore do not have any interdependencies. For example, a graphic element is rendered as an image element on the screen (e.g., see the animated element or the image element in FIG. 5). The rendering involves reading and displaying one type of data (e.g., code for an animation or a data of a video feed). The operation of the data display (e.g., temperature sensor) may involve a different type of data (e.g., signals from a temperature sensor). Since different data is used for these operations, the operations may be safely parallelized by the HMI engineering system and/or the HMI runtime system.

In one embodiment, data dependency is known. Certain elements may never create a data conflict with other elements. For example, the possible actions that may be associated with a given element use different types of data than the possible actions that may be associated with a different given element. Using this predetermined knowledge, the actions for these elements may be automatically assigned to different cores.

In other embodiments, data dependency for a given HMI application is tested for automatic assignment. Data dependency is tested with dataflow analysis. Any dataflow analysis of the actions may be performed, such as dataflow analysis used for compilers. Data dependence may be assumed where the testing is inconclusive. The dataflow analysis is performed on the actions, elements, and data to identify any conflicts. Resource conflicts may be tested.

Where conflicts are identified, the corresponding actions are to be executed sequentially. Where the data or resource usage is independent, the actions and/or elements may be assigned for parallel execution by different cores of the same processor. Different sub-sets of actions and/or elements are associated with different CPUs based on the dataflow analysis.

Any assignment priority may be used, such as assigning on a next core basis. Each data independent element is assigned sequentially to the next core, with the assignment cycling through the available cores.

In an alternative approach, the assignment is load balanced. Automated assignment or reassignment from explicitly assigned cores may be performed based on load balancing. The original explicit assignment may use load balancing, such as presenting only cores with lesser loads as selectable options or indicating load information for use in selecting a core.

The processing load for each action or element may be estimated. The estimate is based on all possible processing or typical processing. The processing may be emulated by the HMI engineering system to determine relative or estimated processing loads. Alternatively, the processing load may be determined with feedback from actual implementation and use in HMI runtime systems. The processing load may be calculated from a number of command lines, number of variables, or other programming.

The load is a processing load. The number of operations to be performed by the processor and/or the time to execute is used as the processing load. Other measures may be used. In other embodiments, the number of calls to a memory, amount of data loaded, number of commands, communication bandwidth or other criteria is used as the load or included in the load determination with the processing load.

Based on the actions or elements, whether previously assigned or being assigned, the relative load of the different cores is determined. The actions or elements are assigned to have a more even load for each core while maintaining data dependency.

The load balancing may account for priority. For example, some communications or operations may be more important, such as actions associated with safety. The core executing these operations may receive less load as part of the load balancing.

Figure 6:
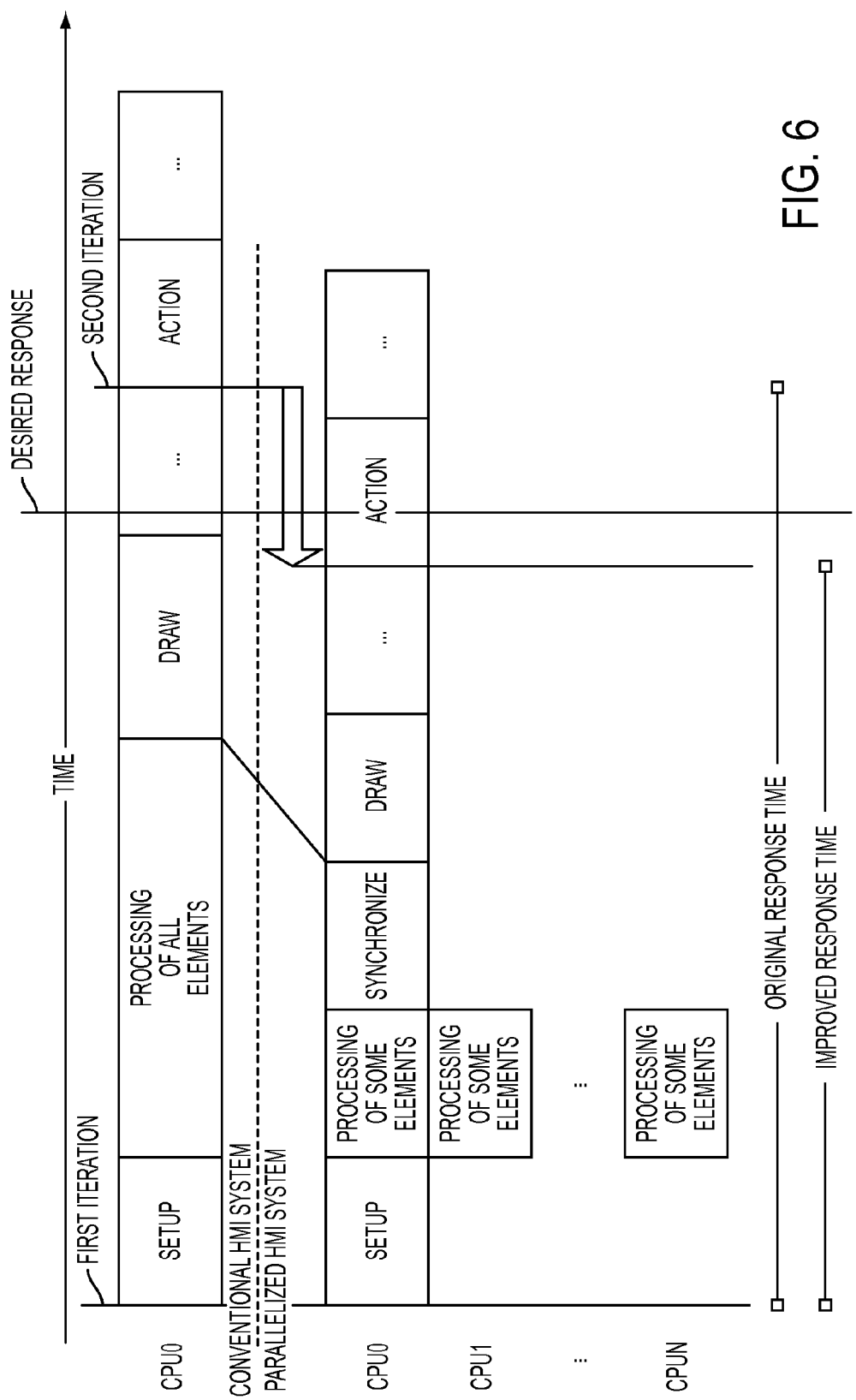
FIG. 6 is a timing diagram comparing examples of sequential and parallel processing of an HMI application.

FIG. 6 shows an example of assigned and/or runtime parallel processing of actions for different elements as compared to sequential. In the conventional HMI application, the actions of all the elements are processed sequentially. None of the actions are parallelized. Other processes, such as setup, drawing, and registering of user actions are provided. In the multi-core assignment, the processing of the HMI elements is divided between different cores. This division allows simultaneous or parallel processing, reducing the time needed to process through all the elements. As a result, the response time to perform an action may be reduced.

In another example, the user first clicks a "Start 1" button that triggers the execution of a script. Before the script finishes, the user clicks a "Start 2" button. This button triggers the execution of a display image script that every second reads a picture from memory and displays the picture in the HMI Screen. For sequential operation, although "Start 2" is clickable and the event is captured by the system, the user does not experience any image changes until the script activated for "Start 1" execution completes. There is a delay between the triggering event and the actual execution of the image rendering.

Consider an additional event that occurs immediately after the "Start 2" button is pressed and before the script for "Start 1" finishes execution. This third event is pressing the "Reset" button that triggers a reset for data used by the script for "Start 1." In this case, a data conflict exists between the actions triggered by "Reset" and "Start 1" button because the two modify the same data. The "Reset" action must be delayed until after the script action finishes.

Since the two actions for "Start 1" and "Start 2" modify different data, there are no dependencies. These actions may instead be parallelized. Performing these actions in parallel may improve the operator experience. Since the action for "Start 2" is performed by a different core, there is a more immediate response to the user's command "Start 2." The operator experiences the performance of the script and the image display simultaneously.

The HMI engineering system separates the actions into different threads. The operating system of the HMI runtime system executes the threads in the assigned cores. The different threads for the actions and/or elements are scheduled for operation in the assigned cores of the multi-core processor. Different sub-sets of actions are performed by different cores.

FIG. 5 shows one example processing of the different threads for the different cores. The multi-core processor is configured by the threads of the HMI application or creation of the threads by the multi-core processor itself. A main-loop thread is run in one core, such as a default or primary CPU. The main-loop thread integrates the execution of the different cores. The main-loop thread calls the threads for the other cores, including the threads for the elements of the HMI application. The HMI runtime main program loop dispatches the workload among the CPUs. A worker thread is provided for each CPU and for any default setting that executes the actions of the elements attached to that CPU. The CPU executing the main-loop program may also execute one or more threads for elements. For example, FIG. 6 shows CPU0 running both the main-loop program and processing of one or more elements. Alternatively, the CPU running the main-loop program does not also execute threads for elements.

The main-loop program synchronizes the threads. After the worker threads finish their jobs (i.e., complete execution). Synchronization by the main program loop guarantees correctness of the HMI application and data dependencies. The synchronization avoids data dependency by timing repetitive execution until after the threads of the various elements are complete. The synchronization may avoid data irregularity or cross calls for the same data. Alternatively, threads for the elements may repeat without synchronization.

By running the HMI application on the HMI device with a multi-core processor, the industrial machinery may be controlled. One or more actuators, display of the elements representing the HMI, communications, control data, sensor readings, data processing, or other operations are controlled based on the processing of the different threads. For example, a visual characteristic (e.g., color, size, blinking or not, or position) of a displayed element changes based on execution of a thread for the element. As another example, an actuator or programmable logic controller is instructed to take action based on execution of a thread for the corresponding element. The actions for the different elements are performed in parallel by processing the threads. Some actions may be performed sequentially.

Figure 7:
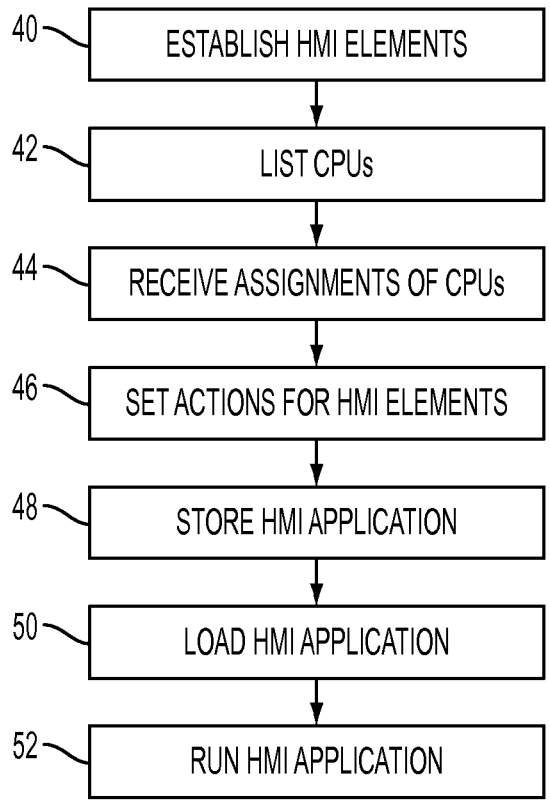
FIG. 7 is a flow chart diagram of one embodiment of a method for parallel processing in an HMI application.

FIG. 7 shows a method for parallel processing in a human-machine interface (HMI) application. The method is implemented by the systems of FIG. 1, FIG. 2, and/or FIG. 3. The method is provided in the order shown, but other orders may be provided. Additional, different or fewer acts may be provided. For example, acts 50 and/or 52 are not performed. Acts 40, 42, 44, 46, and 48 may be performed as part of a HMI engineering system for creating the HMI application. As another example, acts 50 and 52 are performed without acts 40-48. Acts 50 and 52 are performed in a HMI runtime system for implementing the HMI application.

In act 40, HMI elements are established for display on a screen. A developer selects one or more elements from a library of the HMI elements. In a visual programming environment, any desired HMI element is cut-and-pasted, dragged, or otherwise placed on a screen. Code for implementation of the elements is associated with the visual representation. In other embodiments, the elements are programmed. The elements appropriate for a given HMI application are selected and/or created.

In act 42, the computer processing units (CPUs) are listed. The CPUs of the processor that is to run the HMI application being developed are listed. The list may be displayed in a menu. The menu may allow selection of a given CPU by the developer for binding the CPU to an element and associated actions. The list may be displayed separately from the assignment of act 44, such as listing in a separate image or a printed list. In other embodiments, the list is not collected or displayed in a single form or location, but is a list in the sense of being known.

Based on the list of available CPUs, the developer inputs an indication of the CPU for each element or action. For example, the developer places a new element on a screen. The element is added. Upon placement or in a separate workflow, the developer is provided a menu, input field, or other location to indicate a CPU to be associated with the element. For example, the developer is prompted to select a CPU from a displayed list of available CPUs for the element. Alternatively, the developer programs the element to be assigned to the CPU. The process is repeated for each element. Rather than element level input, the developer may input the affinity for each action.

In act 44, the HMI engineering system receives an assignment of the element or action to a CPU. The signals from the input are received and processed to determine the binding. By repeating the input and corresponding reception of the selection, different ones of the CPUs are assigned to different HMI elements and/or actions.

The received assignments are from the developer. In an additional or alternative embodiment, the received assignments are from an automated assignment. For example, the developer fails to select or input an assignment, inputs a "default" or automatic assignment, or both. Some assignments may be explicit while others are not (left to be automated).

Whether always automated or in response to an indication of application of automated assignment, the HMI engineering system automatically assigns the HMI elements and/or actions to different CPUs. Data dependency is reviewed for conflicts. Actions or elements that may be executed separately are assigned to the same or different CPUs.

Any assignment criteria may be used for automated binding. For example, load balancing is performed. The threads for the HMI elements assigned to a default computer processing unit or not assigned are distributed between the different ones of the computer processing units. The distribution is performed to result in similar loading across the CPUs.

In response to the reception, the HMI elements and/or actions are bound to specific CPUs using automated or explicit processes. The selected CPUs for the different elements are assigned to execute the actions and/or elements.

In act 46, the actions are set for the HMI elements. The developer programs the HMI application further. For each element, one or more actions are selected or assigned. The actions control the operation of the element and corresponding communication for that operation. The actions provide for receipt of information, display of information, and/or transmit of control signals or data.

Values for variables, display or visual characteristics, and/or other information may be selected or assigned. For example, the x-position, y-position, read and write I/O functions from sensors and actuators, manipulation of files, setting and monitoring alarms, or other settings are configured. The developer completes programming of the HMI application. Once complete, the programming indicates different actions to be executed by different CPUs.

The HMI application is compiled or otherwise completed from the programming. The various assignments and selections are formed into instructions executable by the multi-core processor. The threads for implementing the HMI application are created by the HMI engineering system. Alternatively, the compiling and/or creation of the threads are performed by the HMI runtime system.

In act 48, the HMI application is stored. The HMI elements, corresponding actions, and assigned CPUs are stored as the HMI application. The complete HMI application is saved for use in one or more HMI devices. The HMI application is stored locally at the HMI engineering system. Alternatively or additionally, the HMI application is transferred for storage elsewhere, such as being transferred over a network to HMI devices. The storage is to any type of memory, such as a cache, a hard drive, solid state, flash, removable, optical, or magnetic.

In act 50, the HMI application is loaded on an HMI device. The HMI device is a runtime system for implementing the HMI application. The HMI device includes the multi-core processor to perform the actions for the HMI application. The display screen, multi-core processor, communications connectors, and other components used by the HMI application to control or monitor the industrial machinery are provided as part of the HMI device. By loading the HMI application, the HMI device may be configured to implement the HMI application.

The HMI device may install the HMI application. The installation may include further processing, such as automated assignment of threads between different CPUs and creation of a main-program loop thread.

In act 52, the HMI application is run by the HMI device. Upon power up or activation of the HMI application, the multi-core processor loads and processes the threads for the HMI application. The actions for the elements of the HMI application are implemented by the CPUs based on the assignments from the user or created automatically.

Figure 8:
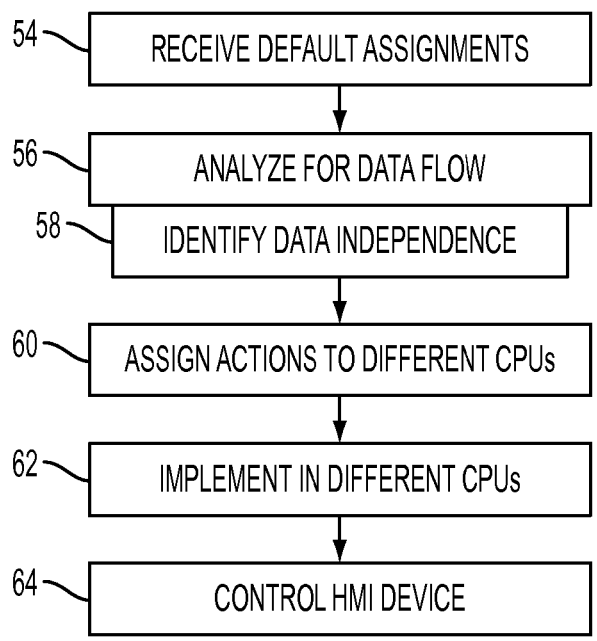
FIG. 8 is a flow chart diagram of another embodiment of a method for parallel processing in an HMI application.

FIG. 8 shows a method for parallel processing in a HMI application. The method is for automatic assignment of CPUs to elements or actions of the HMI application. The method is implemented by the systems of FIG. 1, FIG. 2, and/or FIG. 3. The method is provided in the order shown, but other orders may be provided. Additional, different or fewer acts may be provided. For example, acts 62 and/or 64 are not performed. Acts 54, 56, 58, and 60 may be performed as part of a HMI engineering system for creating the HMI application or as part of an HMI runtime system for implementing the HMI application. As another example, acts 62 and 64 are performed without acts 54-60. Acts 62 and 64 are performed in a HMI runtime system for implementing the HMI application.

In act 54, default assignment of actions or elements is received. The default may be a designation as "default" or may be a lack of any designation. At least some or all of the actions and/or elements are not explicitly assigned to different CPUs. In alternative embodiments, all of the actions and/or elements are assigned, but may be reassigned.

In response to receipt of the default or unassigned setting for one or more actions and/or elements, an analysis may be automatically begun. The receipt is of a trigger event, such as loading the HMI application, addition of an element, compiling the HMI application, or selection of a "default" setting.

In act 56, the dataflow for the HMI actions is analyzed. The data dependency for an action is determined as the action is added or after all actions have been added. The analysis is eventually of all the actions for HMI elements displayed on the screen of the HMI device.

By comparing the data and/or processes used by each action, any conflicts may be identified. Groups of actions associated with different elements that use the same resources are implemented sequentially in a same core. The dataflow analysis identifies the different groups. The groups of actions are tested for conflicts in concurrent execution.

Groups of actions associated with different elements that have no conflict may be implemented in parallel. In act 58, the actions without data or other resource dependency are identified. Concurrent execution will not result in resource conflicts.

In act 60, the actions are assigned to different cores. Different actions are assigned to different cores. The assignment may be by group, such as assigning by elements. The actions of the same element are assigned to the same core, but actions of different elements may be assigned to different cores. One or more elements may be assigned to each core. The assignment is based on there being a lack of data dependency for the actions of the elements.

The assignment may include other criteria. For example, load balancing is considered. The grouping of actions and/or elements by core is assigned to provide similar execution burdens on the cores. The balancing may consider priority and/or operational differences for the different cores.

In act 62, the threads for the different assignments are implemented by the different cores. A main-loop thread calls the threads for the various elements and/or cores. The cores execute the thread for the elements assigned to the respective cores. The threads may be synchronized by a main-loop or primary core process.

In act 64, a HMI device is controlled. By implementing the threads in the different cores, the associated actions and elements are provided for interaction with the industrial machinery and/or an operator. Based on scheduled actions, operator overrides, operator input, sensor input, or other data, the HMI application controls the HMI device and the related industrial machinery. The display of various elements may respond to sensed data, action implementation, operator input, actuator activation, or other information based on the HMI application.

Implementing a HMI application programmed for sequential operation (e.g., single core) in a multi-core processor may provide some improvement as compared to implementation in a single-core processor. For two cores compared to one core execution, an improvement in response time may be about 14% given operating system-based assignment of the HMI application to one core and assignment of other component processes to another core. The theoretical improvement for two cores is 50% or 15.35 ms. Similarly, four cores may improve the response time by about 21% when the theoretical limit is 75% or 7.675 ms. Eight cores may improve the application by about 22% when the theoretical limit is of 88% or 3.83 ms. Relying on mere operating system assignment results in low parallel efficiency. Using explicit or automated assignment of actions or elements of an HMI application may result in efficiency closer to the theoretical. By introducing parallel programming primitives, the efficiency gap from theoretical may be reduced.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system for parallel processing in a human-machine interface (HMI) application, the system comprising:
    at least one actuator connection of an actuator of an industrial machinery;
    a multi-core processor electrically connected with the at least one actuator connection;
    a display operable to display HMI elements associated with the at least one actuator connection;
    an engineering system for creating the HMI application, the engineering system configured to allow user assignment of computer processing units of the multi-core processor based on selection by a user of different ones of the computer processing units of the multi-core processor for different ones of the HMI elements and to allow a setting by a user of actions for each of the HMI elements;
    a memory having stored the elements for the display and the actions corresponding to the elements together with the assigned computer processing units as an HMI application;
    wherein the multi-core processor is configured to associate a first sub-set of the actions with a first computer processing unit based on a first user selection, associate a second sub-set of the actions with a second computer processing unit based on a second user selection, schedule first and second HMI threads for the first and second computer processing units based on the first and second sub-sets, process the first and second HMI threads with the first and second computer processing units, and control the at least one actuator and the display of the elements as a function of the processing of the first and second HMI threads.

2. The system of claim 1, wherein the multi-core processor is part of an HMI runtime system.

3. The system of claim 1, wherein the multi-core processor is configured to perform a dataflow analysis of the actions and associate first and second sub-sets additionally based on the dataflow analysis.

4. The system of claim 3, wherein the multi-core processor is configured to determine data dependency from the dataflow analysis and associate based on the data dependency.

5. The system of claim 1, wherein the multi-core processor is part of an HMI device.

6. The system of claim 1, wherein the elements comprise a button, a progress bar, an image, a data display, or combinations thereof, and wherein the multi-core processor is configured to control at least one of the elements by altering a visual characteristic.

7. The system of claim 1, wherein the multi-core processor is configured to run a main-loop thread in a third core, the main-loop thread calling the first and second HMI threads.

8. The system of claim 7, wherein the multi-core processor is configured to synchronize the first and second HMI threads as part of the main-loop thread.

9. The system of claim 1, wherein the multi-core processor is configured to load balance across the first and second computer processing units as a function of execution time, the associations of the first and second sub-sets of actions being a function of the load balance.

10. The system of claim 1, wherein the display is configured to display a list of a plurality of computer processing units of the multi-core processor via the engineering system for creating the HMI.

11. The system of claim 1, wherein the engineering system is further configured to establish the HMI elements by providing a library of the HMI elements with a list of actions, and wherein setting the actions comprises selecting, by the user, the actions corresponding to the HMI elements.

12. The system of claim 11, wherein the list comprises a menu for selection of the computer processing units for one or more of the HMI elements.

13. The system of claim 1, wherein the industrial machinery comprises machinery of a power facility, a chemical plant, a manufacturing facility, or a reactor.

14. The system of claim 1, wherein the actuator of the industrial machinery is configured to apply a force changing an industrial process.

\* \* \* \* \*